United States Patent [19]
Walance

[11] Patent Number: 5,617,466
[45] Date of Patent: Apr. 1, 1997

[54] MECHANISM FOR CONTROLLABLY ENABLING TEST SET TO ASSERT OFF-HOOK CONDITION ON TELEPHONE LINE IN DEPENDENCE UPON DETECTION OF PRESCRIBED VOLTAGE LEVEL AND ABSENCE OF DATA TRAFFIC

[75] Inventor: Robert B. Walance, Newbury Park, Calif.

[73] Assignee: Harris Corporation, Melbourne, Fla.

[21] Appl. No.: 407,878

[22] Filed: Mar. 20, 1995

[51] Int. Cl.$^6$ .............................. H04M 1/24; H04M 3/08; H04M 3/22
[52] U.S. Cl. .................................... 379/28; 379/1; 379/7; 379/21; 379/22; 379/29
[58] Field of Search .............................. 379/1, 7, 21, 27, 379/28, 29, 34, 22, 26, 32

[56] References Cited

U.S. PATENT DOCUMENTS

| | | | |
|---|---|---|---|
| 4,939,765 | 7/1990 | Benjamin | 379/21 |
| 4,969,179 | 11/1990 | Kanare | 379/27 |
| 5,005,197 | 4/1991 | Parsons | 379/29 |
| 5,025,466 | 6/1991 | Hilligoss | 379/1 |
| 5,157,708 | 10/1992 | Garthwaite | 379/21 |

Primary Examiner—Wellington Chin
Assistant Examiner—Vijay Shankar
Attorney, Agent, or Firm—Charles E. Wands

[57] ABSTRACT

The possibility of corrupting digital data traffic carried by a data line (powered or unpowered), by the connection of a telephone test set to the data line is effectively prevented by augmenting the telephone test set with a mechanism that prevents the test set from asserting an OFF-HOOK condition on the line, unless it has been determined that each of two conditions are satisfied. These conditions are: 1- that no digital data traffic is being carried by the line; and 2- that the electrical voltage condition of the line satisfies a prescribed minimum voltage level criterion. If either of these conditions is not satisfied, a switch circuit installed in the test set's connection path to the line is maintained in a default, open condition, so that it is effectively impossible for the line to be presented with an OFF-HOOK condition through operation of the test set. This default condition remains in effect until both criterion are fulfilled. As a further safety precaution, should the line to which the test set is connected be determined to be carrying digital data traffic, the invention causes an audible alert tone to be generated as a warning signal to the craftsperson.

33 Claims, 3 Drawing Sheets

MECHANISM FOR CONTROLLABLY ENABLING TEST SET TO ASSERT OFF-HOOK CONDITION ON TELEPHONE LINE IN DEPENDENCE UPON DETECTION OF PRESCRIBED VOLTAGE LEVEL AND ABSENCE OF DATA TRAFFIC

FIELD OF THE INVENTION

The present invention relates in general to telephone test set equipment, and is particularly directed to a mechanism installable in a craftsperson's test set for preventing a test set that has been connected to a telephone line from asserting an OFF-HOOK condition on the line, unless monitoring the electrical condition of the line indicates that no digital data traffic is being carried by the line and the electrical voltage condition of the line satisfies a prescribed minimum voltage level criterion. In the event the monitored line is carrying digital data traffic, the invention also causes an audible alert tone to be generated.

BACKGROUND OF THE INVENTION

Because telephone lines are often used to carry a variety of diverse signal formats, care must be taken when connecting a line to equipment such as a telephone test set, in order to ensure that the connection is non-intrusive and does not degrade the quality of signals being conveyed over the line. This requirement is particularly crucial in the case of connecting a device to a 'data' line, especially a powered data line, namely, a line that not only may be transmitting digital data traffic, but also carries a DC voltage to be used for powering transmission devices along the line (for example repeater and customer premise equipment). If an external device, such as a test set, is connected to a powered data line in such a manner as to load the line (e.g. by placing a DC load impedance between either tip or ring and ground), severe degradation and/or interruption of service will occur.

Of course, simply connecting leads of a test set to the line, without effectively enabling circuitry functionality of the test set which would place a load on the line, is not necessarily intrusive. However, if a test set, once connected to the line by the craftsperson, is placed in a condition that would modify the electrical condition of the line, such as the test set going OFF-HOOK and thereby inserting a loading impedance across the line, any digital data traffic carried by the line is impacted, which creates not only an unacceptable disruption in information transmission to customers, but an embarrassment and loss of revenue to the telephone service provider.

Previous attempts to deal with this problem have included the use of compact or 'pocket' data traffic detector devices, which are essentially frequency meters that monitor the line for the presence of high frequency signals. Such 'palm of the hand'-held devices are customarily connected between tip and ring, and monitor whether the line is carrying signals that lie in a relatively high frequency band (above the normal audio band for voice signals). The devices may contain one or more LED display elements that are illuminated in association with the band of detected signals. The purpose of such devices is to alert the craftsperson to the presence of data traffic, so that the craftsperson will not proceed to connect a normal test set to the line and then cause the test set to go OFF-HOOK, if data traffic has been indicated.

To date, however, there is no mechanism, either integrated within or retrofitable to a craftsperson's test set, which actively prevents the craftsperson from even accidentally placing a line-connected test set in an OFF-HOOK condition, and thereby avoid the potential for severe degradation and/or interruption of data transmission on the line.

SUMMARY OF THE INVENTION

In accordance with the present invention, the possibility of corrupting digital data traffic being carried by a telephone line, particularly one carrying a DC voltage (namely, a powered line), by the connection of equipment, such as a telephone test set, to such a line, is effectively prevented, by augmenting the telephone test set equipment to include a mechanism that will prevent the test set from asserting an OFF-HOOK condition on the line, unless it has been determined that each of two conditions are satisfied. These conditions are: 1- that no digital data traffic is being carried by the line; and 2- that the electrical voltage condition of the line satisfies a prescribed minimum voltage level criterion. If either of these conditions is not satisfied, a switch circuit installed in the test set's connection path to the line is maintained in a default, open condition, so that it is effectively impossible for the line to be presented with an OFF-HOOK condition through operation of the test set. This default condition remains in effect until both criterion are fulfilled. As a further safety precaution, should the line to which the test set is connected be determined to be carrying digital data traffic, the invention causes an audible alert tone to be generated as a warning signal to the craftsperson.

To satisfy these two criteria, the present invention comprises a circuit arrangement that is retrofitable to or may be incorporated into a test set. The circuit arrangement includes first and second terminals, which are connectable to the tip and ring leads of the telephone line circuit. The first terminal is coupled to one side of a normally open test set talk mode switch, which is closed by the craftsperson in order to place the test set in the OFF-HOOK talk mode. A second side of the talk mode switch is coupled to a first input of a full wave rectifier circuit, a second input of which is coupled to the second terminal. The full wave rectifier is coupled across the tip-ring path to ensure that circuit operation is independent of whether the craftsperson connects the input terminals to tip and ring or to ring and tip.

The first and second terminals are further coupled to a data detector, which monitors the telephone line for digital data traffic activity. If digital data traffic is detected, the data detector output is operative to cause a supervisory micro-controller to maintain a control gate in the disabled state and supply an output to a tone generator, for providing a warning tone to the craftsperson that data is being transmitted over the monitored line. The micro-controller is also coupled to the output of a DC voltage level detector. The DC voltage level detector is connected to the full wave rectifier and is operative to compare the rectified voltage with a prescribed DC voltage threshold. The purpose of looking for the presence of a prescribed DC voltage on the line is to ensure that loop current will be drawn when placing an OFF-HOOK terminating impedance on the line by the closure of the talk mode switch. Only if the detected voltage is at least as great as the threshold, does the DC voltage detector provide an output voltage level that will cause the micro-controller to enable the control gate.

The output of the control gate is coupled to a normally open, voltage-controlled switch, which is coupled in the tip/ring termination path. Only in response to the conditions that the monitored telephone line is carrying no data traffic and there is at least a prescribed minimum DC voltage across tip and ring, will the micro-controller cause the control gate to generate an enabling signal to the normally open voltage controlled switch. When closed, this switch is operative to terminate the internal tip/ring path with respective DC and AC termination impedances. If the switch is closed by the output of the control gate, the craftsperson is provided with the ability to place DC and AC termination impedances across the tip and ring input terminals by closing the talk mode switch. Otherwise, the present invention makes it effectively impossible for the craftsperson to place an OFF-HOOK condition on the line (bridge the tip and ring lines with DC and AC termination impedances) by closing the talk mode switch.

The DC voltage level detector is operative to provide a prescribed output voltage level in response to detecting the presence of at least the prescribed minimum DC threshold voltage across tip and ring. This output voltage level is coupled to a monitored threshold voltage input of the supervisory micro-controller. If the monitored voltage between tip and ring is less than the prescribed DC threshold level, the micro-controller disables the control gate, so that the voltage controlled switch remains open.

The data detector includes an analog circuit portion, which is operative to monitor the line for very low amplitude signal transitions which may qualify as digital data transitions. The output of the data detector is coupled as a further input to the supervisory micro-controller. If analysis of the signal transitions determines that data is present, the micro-controller disables the control gate, so as to prevent the voltage controlled switch from being closed.

In operation, the micro-controller is normally in a powered-down mode in the absence of a wake-up stimulus (a low-to-high transition) applied to any of a plurality of stimulus inputs, which include the outputs of the data and DC voltage detectors. In response to any of these monitored inputs transitioning from a low-to-high state, the micro-controller is alerted to activity on the line, and maintains the disable state of the control gate. It then proceeds through a routine which examines the stimulus inputs to determine whether the stimulus is a ringing signal, data, or a prescribed voltage level. For either ringing or data, an audible tone is generated and the control gate remains disabled, preventing the voltage controlled switch from being closed. If the stimulus is only from the voltage detector and indicates the presence of a prescribed voltage between tip and ring, the control gate becomes enabled, and thereby closes the voltage controlled switch, so as to allow the craftsperson to place the test set in an OFF-HOOK mode (place AC and DC termination impedances across tip and ring) by closing the talk mode switch.

DETAILED DESCRIPTION

Figure 1:
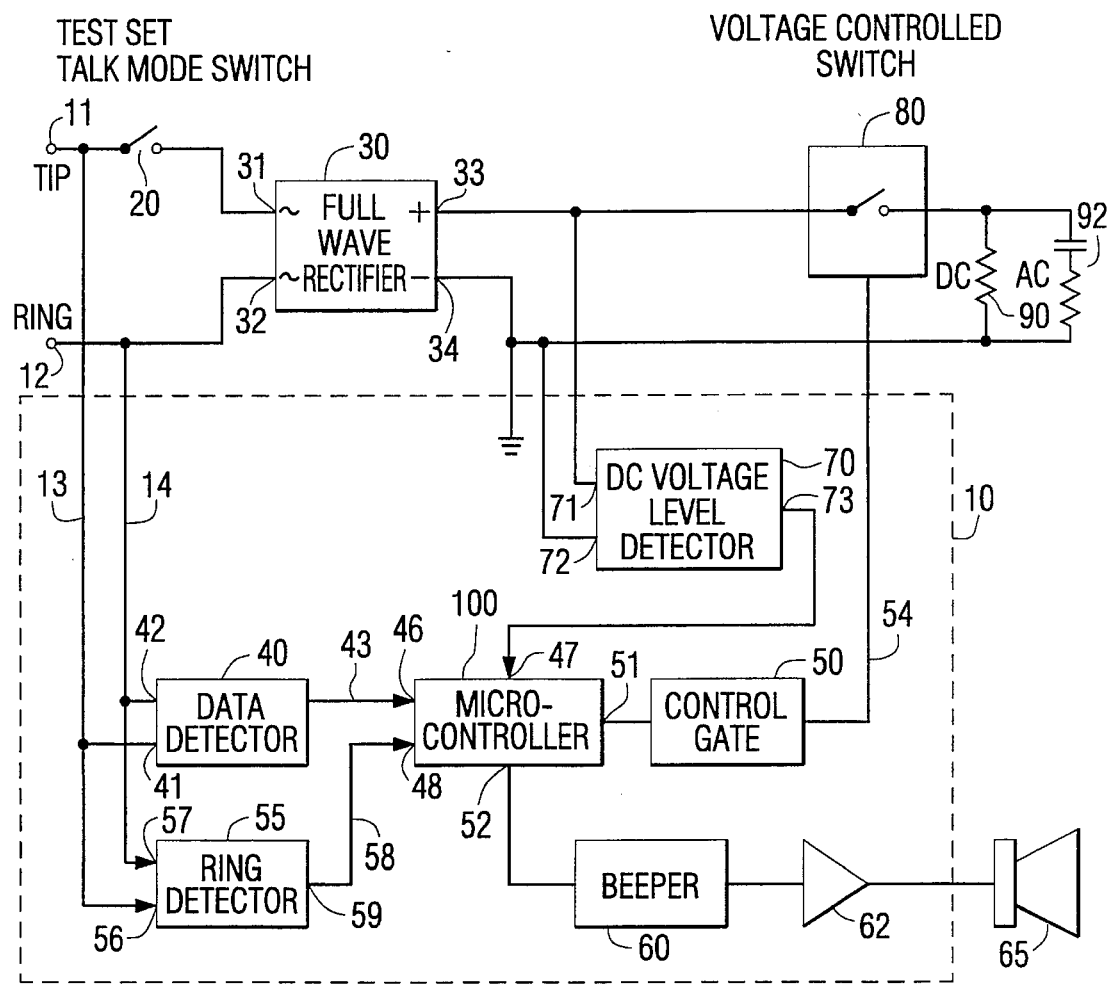
FIG. 1 diagrammatically illustrates the controlled test set connection arrangement according to the present invention.

Before describing in detail the test set augmentation circuitry arrangement of the present invention for preventing the test set from asserting an OFF-HOOK condition on the line unless prescribed precursor electrical conditions on the tip and ring leads of the line are satisfied, it should be observed that the present invention resides primarily in what is effectively a prescribed combination of conventional signal processing circuits and a supervisory micro-controller, installable within a conventional test set. Once installed in the manner to be described, the present invention will still permit a craftsperson to use the test set to perform its normal functionality, but will additionally provide an interface that prevents the application of an OFF-HOOK condition that might otherwise cause corruption or loss of data on the accessed line.

The circuitry of the test set is otherwise essentially unaffected. Consequently, the configuration of the circuitry employed in the present invention and the manner in which it is interfaced with signalling lines of the test set and the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the circuit arrangement in a convenient functional grouping, whereby the present invention may be more readily understood.

As pointed out briefly above, to successfully prevent the potential corruption of digital data traffic be carried by a telephone line, particularly a powered line, by operation of a telephone test set, the present invention augments the telephone test set with a circuitry arrangement that normally prevents the test set from being able to assert an OFF-HOOK condition on the line (couple either an AC or a DC termination impedance across tip and ring), unless prescribed precursor electrical conditions on the tip and ring leads of the line are satisfied.

As will be described, the circuitry arrangement according to the present invention determines whether the line is in a 'data clear' state, namely a state in which no digital data traffic is being carried by the line, and whether the electrical voltage condition of the line satisfies a prescribed minimum voltage level criterion. In the event that either of these conditions is not realized, a switch circuit installed in the test set's connection path to the line is maintained in a default, open condition, so that it is effectively impossible for the line to see an OFF-HOOK condition by the craftsperson closing a talk mode switch. This default condition remains in effect until both criterion are satisfied.

Referring now to FIG. 1, the controlled test set connection arrangement according to the present invention is diagrammatically illustrated as principally surrounded by broken lines 10 and comprising a first input terminal 11 and a second input terminal 12, which are connectable to the tip/ring and ring/tip leads of a telephone line circuit of interest. The first input terminal 11 is coupled via line 13 through a normally open test set talk mode switch 20 to a first input 31 of a full wave rectifier circuit 30, a second input 32 of which is coupled via line 14 to the second input terminal 12. As pointed out above, the full wave rectifier 30 is coupled across the tip-ring path to ensure that circuit operation is independent of whether the craftsperson connects the input terminals 11 and 12 to tip and ring or to ring and tip. The first input terminal 11 is further coupled over line 13 to a first input 41 of a data detector 40, to be described below with reference to FIGS. 3 and 4. The second input terminal 12 is coupled over line 14 to a second input 42 of data detector 40.

As will be described, data detector 40 monitors the telephone line for digital data traffic activity; if digital data traffic is detected, data detector 40 provides an output signal (prescribed logic level) at an output terminal 43 to a first input 46 of a supervisory micro-controller 100 (shown in detail in FIG. 4, to be described), respective outputs 51 and 52 of which are coupled to a control gate circuit 50 and to a tone generator circuit 60. The output of tone generator circuit 60 is coupled through an amplifier 62 to a speaker unit 65, so that an audible precautionary warning tone is produced in the event that data is being transmitted over the monitored line.

Figure 2:
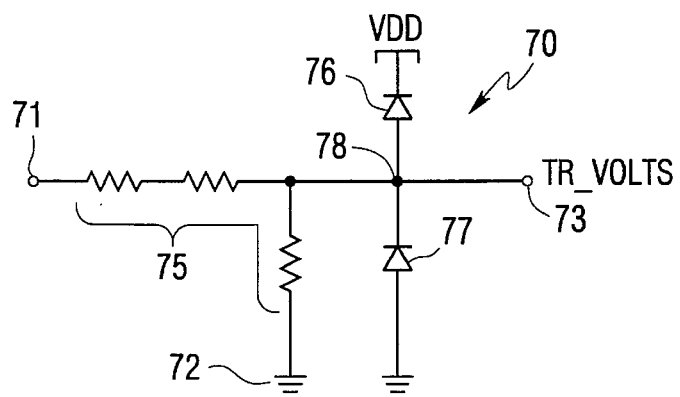
FIG. 2 schematically illustrates the DC voltage level detector 70 of FIG. 1.

Micro-controller 100 has a second input 47 which is coupled to the output 73 of a DC voltage level detector 70, shown in detail in FIG. 2, to be described. A third input 48 of micro-controller 100 is coupled via line 58 from the output 59 of a ring detector 55, which is coupled via inputs 56 and 57 to the tip and ring terminals 11 and 12. Whenever a ringing signal (e.g. a 20 Hz tone) is detected by ring detector 55, an output is applied via line 58 to the micro-controller 100, which responds by generating a prescribed ringing tone audio signal, as will be described.

The DC voltage level detector 70 has a first input 71 connected to a first output 33 of full wave rectifier 30, and a second input 72 referenced to ground potential (GND), to which a second output 34 of rectifier 30 is connected, as shown. DC voltage level detector 70 is operative to compare the rectified voltage provided by rectifier 30 with a prescribed DC voltage threshold (e.g. +5 VDC). If the detected voltage is at least as great as the threshold, the output 73 of DC voltage detector 70 has a first logical output. On the other hand, if the detected voltage is not at least as great as the threshold, the output 73 of DC voltage detector 70 has a second logical output. As described previously, the presence of a prescribed DC voltage on the line is necessary to ensure that loop current will be drawn when placing an OFF-HOOK terminating impedance on the line by the closure of the talk mode switch. In order for the DC voltage detector 70 to provide a prescribed voltage level input to micro-controller 100, it is necessary that the detected DC voltage be at least as great as the threshold.

Only if both inputs 46 and 47 to micro-controller 100 are at the same logical level (e.g. a logical '1'), indicating that the monitored telephone line is carrying no data traffic and that there is at least a prescribed minimum DC voltage across tip and ring, will micro-controller 100 generate an enabling signal to control gate 50, so that it may supply a switch closure signal over an output line 54 to a normally open voltage controlled switch 80. Switch 80 is coupled into the telephone circuit through the tip and ring path and respective DC and AC termination impedances, shown in simplified form as 90 and 92, which are coupled between switch 80 and ground, as shown.

Once switch 80 is closed, the craftsperson has the ability to terminate the tip/ring path with DC and AC termination impedances, by closing the talk mode switch 20. Since switch 80 is closed by control gate 50 only in response to the two-fold condition that the line be carrying no digital data traffic and that there is at least a measurable minimum DC voltage across tip and ring, it is effectively impossible for the craftsperson to place an OFF-HOOK condition on the line (bridge the tip and ring lines with DC and AC termination impedances) by closing the talk mode switch 20.

Referring now to FIG. 2, the DC voltage level detector 70 of FIG. 1 is schematically illustrated as comprising a voltage divider/rectifier circuit comprised of a voltage divider resistor network 75 connected between full wave rectifier output terminal 33 and ground. Respective diodes 76 and 77 are coupled between ground and a reference DC supply rail (VDD), with the node 78 between the diodes being connected to the resistor divider network 75 and to output terminal 73, from which a tip-to-ring DC voltage level output TR_VOLTS is derived. The combination of the voltage divider network 75 and diode connections 76 and 77 is operative to produce a prescribed high voltage level (e.g. on the order of +3 VDC) in the presence of a prescribed DC voltage (e.g. at least 5 VDC) across tip and ring. This voltage level on output terminal 73 (TR_VOLTS) is applied to a monitored threshold voltage input of micro-controller 100. Thus, in the present example, as long as at least 5VDC is applied across tip and ring, output terminal 73 provides the prescribed high voltage level to the monitored threshold voltage input of micro-controller 100. However, if the monitored voltage between tip and ring is less than the prescribed DC level, the voltage level at terminal 73 goes low (ground or zero volts), which is read by micro-controller 100 as an unpowered line and not capable of sourcing loop current for an OFF-HOOK test set.

Figure 3:
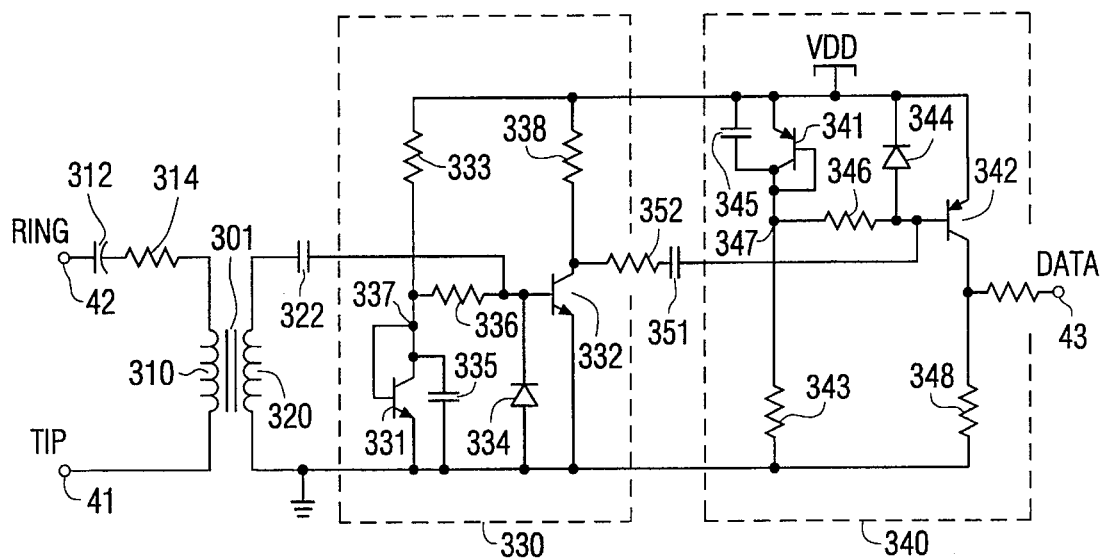
FIG. 3 schematically shows an analog circuit portion of the data detector 40 of FIG. 1.

FIG. 3 schematically shows an analog circuit portion of the data detector 40, which is operative to detect those signal transitions on the monitored line which may qualify as digital data transitions. As a non-limiting example, data detector 40 may be operative to detect pulses having amplitudes as low as on the order of 100 mV. The occurrence of such pulses is indicated by a prescribed high voltage level on output DATA terminal 43, as will be described. As shown in FIG. 3, the analog circuit portion of the data detector comprises an isolation transformer 301 having a primary winding 310 coupled through a capacitor 312 and resistor 314 to the tip- and ring-connected input terminals 41 and 42 of the data detector. Capacitor 312 is operative to block DC current and to limit the frequency of signals eligible for consideration as possible data transitions to those well within the normal bandwidth customarily used for digital data traffic. Resistor 314 ensures that a minimum impedance is applied across tip and ring. Transformer 301 has a secondary winding 320 coupled to ground and through a DC blocking capacitor 322 to cascaded first and second complementary polarity transistor amplifier stages 330 and 340.

Transistor amplifier circuit 330 comprises a first high gain NPN bipolar transistor 331 having its collector and base diode-connected through a bias resistor 333 to the VDD voltage rail and its emitter coupled to ground. A bypass capacitor 335 is coupled between the common node 337 of the collector and base of transistor 331 and ground, while a coupling resistor 336 is connected between node 337 and the base of a second NPN transistor 332. Diode-connected transistor 331 is operative to draw a very low current through resistor 333, so as to establish the base voltage of transistor 332 at a value very close to turn-on, and thereby provide a sensitivity to very low amplitude transitions across tip and ring. A diode 334 is connected between the base of transistor 332 and ground while a further bias resistor 338 is coupled between the VDD rail and the collector of transistor 332. The emitter of transistor 332 is coupled to ground, while its collector is coupled through series connected capacitor 351 and resistor 352 to the base of PNP transistor 342 of amplifier circuit 340.

Complementary transistor amplifier circuit 340 is configured substantially identically to amplifier circuit 330, but employs complementary polarity type components, and bias connections to provide additional gain and a stage of inversion to amplifier circuit 330. As shown, amplifier circuit 340 comprises a first PNP bipolar transistor 341 having its collector and base diode-connected through a bias resistor 343 to ground and its emitter coupled to the VDD voltage rail. A bypass capacitor 345 is coupled between the common node 347 of the collector and base of transistor 341 and the VDD rail, while a coupling resistor 346 is connected between node 347 and the base of a second NPN transistor 342. A diode 344 is connected between the base of transistor 342 and the VDD rail, while a further bias resistor 348 is coupled between ground and the collector of transistor 342. The emitter of transistor 342 is coupled to the VDD rail, while its collector is coupled through a resistor 361 to a DATA output terminal 43.

Figure 4:
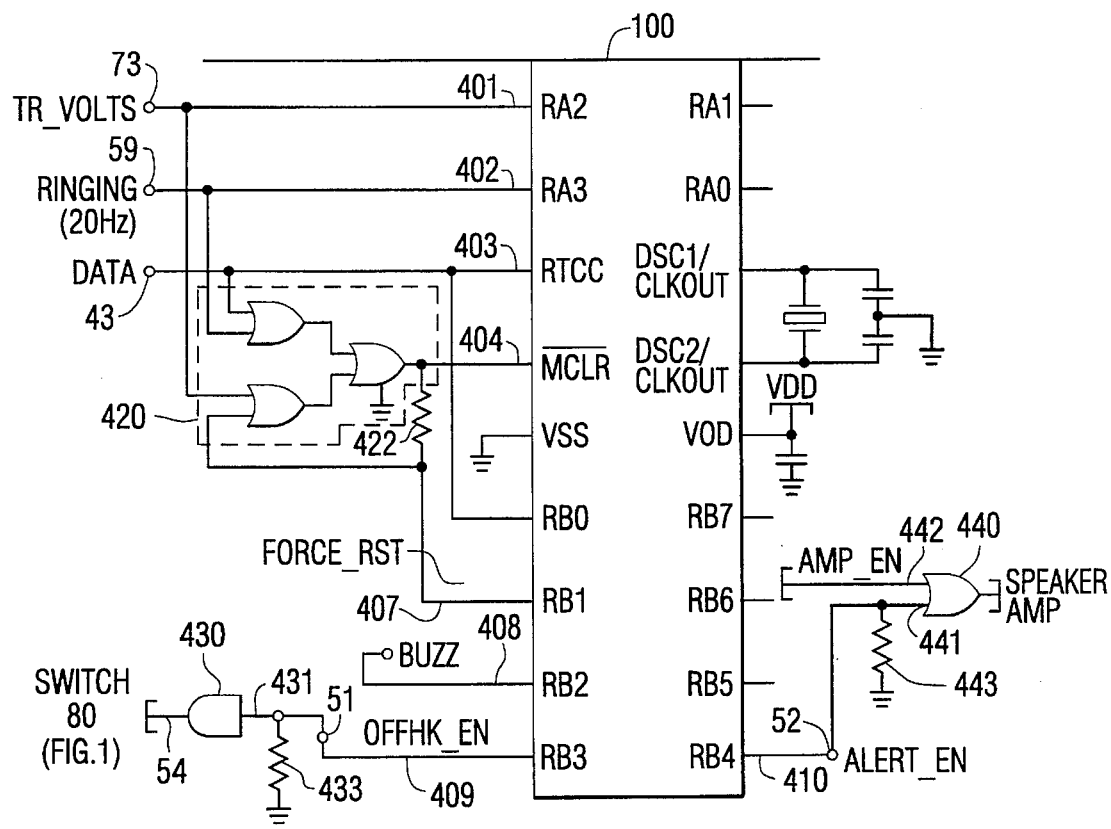
FIG. 4 shows the manner in which a supervisory micro-controller is connected to respond to the outputs from the DC voltage level detector of FIG. 2 and the data detector of FIG. 3.

FIG. 4 shows the manner in which supervisory micro-controller 100 is connected to respond to the output DATA on terminal 43 from data detector 40, and the output TR_VOLTS on terminal 73 of DC voltage detector 70, for controlling the generation of a control signal for controllably enabling (closing) voltage-controlled switch 80. Micro-controller 100 comprises a standard, commercially available lower power micro-controller chip, and is battery powered, so as to be normally in a powered-down mode in the absence of a wake-up stimulus applied to one of its three stimulus inputs 401, 402 and 403.

Of these inputs, the first input 401 is coupled to receive the TR_VOLTS signal on terminal 73 from the DC voltage detector 70, described above with reference to FIG. 2. As will be described, as long as the voltage level TR_VOLTS on input 401 is low (which indicates that the voltage across tip and ring is less a prescribed minimum value for drawing sufficient loop current, as described previously), micro-controller 100 is operative to maintain an OFFHK_EN output terminal 409 in a default logical low, high impedance state, which prevents the test set from terminating the tip and ring path with respective AC and DC termination impedances 90 and 100.

The second micro-controller input 402 is coupled to receive a ringing signal. As described above, with reference to FIG. 1, whenever a ringing signal (e.g. a 20 Hz tone) is detected by ring detector 55, a signal is applied to input the input 48 of micro-controller 100. In FIG. 4, this signal is coupled to input 402, to which the micro-controller responds by generating a prescribed ringing tone audio signal at a BUZZ output terminal 408, which effectively corresponds to the tone generator 60 of FIG. 1. This tone signal is coupled through speaker amplifier 62 to associated speaker 65, so that an audible tone will be produced to alert the craftsperson of an incoming call on the monitored line. (As will be described, the BUZZ output terminal 408 is also employed to provide a prescribed data alert warning tone, in response to the micro-controller 100 detecting data signals on input 402.)

The third input 403 is coupled to receive the DATA signal on terminal 43 from the analog circuitry portion of the data detector 40, shown in FIG. 3, described above. Input 403 is coupled to a real time counter clock (RTCC) input of the micro-controller, which is coupled to an internal soft-counter. This soft-counter is programmable to count transitions in the RTCC input (here the DATA signal from the output terminal 43 of the data detector's analog circuitry). In response to counting a prescribed number of transitions within a given count interval (as a non-limiting example, 500 transitions within 1/16th of second, indicative of a data clock rate of at least 8000 transitions per second), the soft-counter within the micro-controller 100 provides an output indicating that digital data signals are being transmitted over the monitored line. This determination will also cause the logic state of OFFHK_EN output 409 terminal to be maintained in its default low logic level, high impedance state.

The signals supplied to each of inputs 401, 402 and 03 are further coupled to an OR gate 420, the output of which is coupled to a master clear terminal 404 of micro-controller 100. Master clear input 404 is normally low, so that, when not active, micro-controller 100 draws only minimum current, and does not substantially reduce battery life. When any of its inputs 401, 402 and 403 goes high, however, the master clear input 404 at the output of OR gate 420 goes high, which pulls the micro-controller's master clear input 404 high and wakes up the micro-controller. (A latch resistor 422 is coupled between the output of the OR gate 420 and a high impedance force reset terminal 407 from the micro-controller, to provide sufficient time for the micro-controller 100 to wake up in response to even a very short pulse that created the high condition at the output of the OR gate 420.)

As noted above, micro-controller 100 has an OFFHK_EN output terminal 409, which is normally in a logical low, high impedance state. OFFHK_EN output terminal 409 is coupled to input 431 of an AND gate 430. A low impedance resistor 433 is coupled between input 431 and ground, so that the high impedance (logical low default) state of OFFHK_EN output terminal 409 is operative to maintain the application of a low voltage level to input 431 of AND gate 430. The output of AND gate 430 effectively corresponds to the output of control gate 50 in FIG. 1 and is coupled over line 54 to the voltage controlled switch 80. Thus, in this default state, voltage controlled switch 80 is held open, preventing the closure of talk mode switch 20 from placing a termination impedance across tip and ring.

Micro-controller 100 also has an ALERT_EN output terminal 410, which is normally in a logical low, high impedance state and is coupled to a first input 441 of an OR gate 440. A second input 442 of OR gate 440 is coupled to receive a speaker amplifier enable signal, for enabling speaker amplifier 62 that drives output speaker 65. A high impedance resistor 443 is coupled between input 441 and ground (GND), so that the normal logical low output terminal 410 is operative to maintain the application of a logical low voltage level to input 441 of OR gate 440. The output of OR gate 440 is coupled to speaker amplifier 62 which drives speaker 65. When an alert tone (or ringing tone) is to be generated, the micro-controller 100 asserts a high on its ALERT_EN output terminal 410, so that an amplifier speaker enable input to OR gate 440 will allow the output speaker amplifier 62 to be powered up. The tone signal on BUZZ output 408 is coupled through speaker amplifier 62 as the audible tone of speaker 65.

Figure 5:
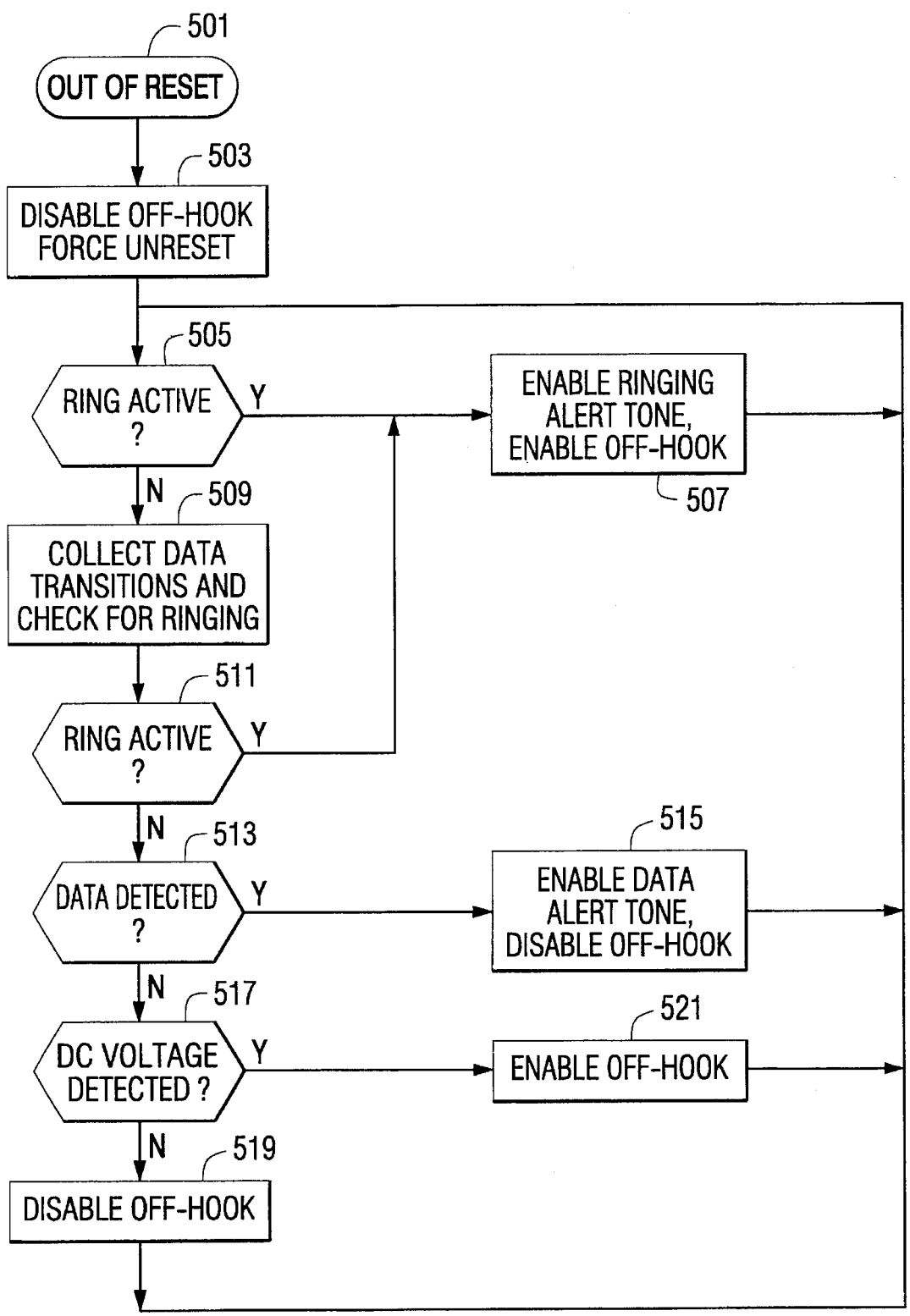
FIG. 5 is a flow diagram showing the sequence of operations carried out by the supervisory micro-controller 100 of FIG. 4 in response to receiving a wake-up stimulus on any of its three stimulus inputs 401, 402 and 403.

FIG. 5 is a flow diagram showing the sequence of operations carried out by the supervisory micro-controller 100, in response to receiving a wake-up stimulus on any of its three stimulus inputs 401, 402 and 403. As pointed out above, micro-controller 100 is a low power chip, and is normally in a powered-down mode in the absence of a wake-up stimulus (a low-to-high transition) is applied to one of its three stimulus inputs 401, 402 and 403. As also previously described, with each of inputs 401, 402 and 403 normally being low and being coupled through OR gate 420 to master clear terminal 404, the master clear input 404 is normally low, so that micro-controller 100 is normally in a 'snooze' mode, drawing only minimum current, to maintain battery life.

In response to any of the inputs 401, 402 and 403 transitioning from a low-to-high state, the master clear input 404 at the output of OR gate 420 goes high, which transitions the micro-controller 100 out of its reset condition (process entry 501 in FIG. 5) pulls the master clear input high and wakes up the micro-controller. At step 503, the micro-controller disables (asserts a low on) OFFHK_EN output terminal 409, which disables AND gate 430 and thus prevents switch 80 from closing. In addition, the a high impedance force reset terminal 407 from the micro-controller is asserted, to provide sufficient time for the micro-controller 100 to wake up in response to even a very short pulse that created the high condition at the output of the OR gate 420.

At query step 505, a determination is made as to whether the stimulus originated at ringing signal input terminal 402. If the answer to step 505 is YES, the sequence transitions to step 507, which ALERT_EN output terminal 410 to go high, whereby a high logic level is applied to OR gate 440, so that the speaker amplifier 62 will be enabled and thus drive output speaker 65; OFF-HOOK is also enabled. A ringing tone at output terminal 408 is then applied through the output speaker amplifier to the speaker as an audible tone, alerting the craftsperson of an incoming call on the monitored line. The routine then loops to step 505.

If the answer to query step 505 is NO, the routine transitions to step 509, which causes the internal soft-counter to begin counting transitions in the DATA signal on input 403 from the data detector analog circuitry of FIG. 3. At the same time the processor continues to monitor the ringing terminal 402 for a ringing signal. If ringing is detected in a query step 511, the routine again transitions to step 507, described above. If the answer to query step 511 is NO, the routine transitions to step 513, to determine whether the signal excursions monitored on line 403 correspond to data traffic. Namely, the output of the soft-counter is examined to determine whether data is being carried by the monitored line.

As described previously, the soft-counter counts transitions in the RTCC input, namely the DATA signal from the output terminal 43 of the data detector's analog circuitry of FIG. 3 and, in response to counting a prescribed number of transitions within a given count interval (e.g. 500 transitions within 1/16th of second, corresponding to a data clock rate of at least 8000 transitions per second), the soft-counter within the micro-controller 100 provides an output indicating that digital data signals are being transmitted over the monitored line. Thus, if the counter output indicates the presence of data on the line, the answer to query step 513 is YES, and the routine transitions to step 515, which causes the OFFHK_EN output 409 to remain in its default low logic level, high impedance state. In addition, the ALERT_EN output terminal 410 is asserted high, so that a high logic level is applied to OR gate 440, to enable the speaker amplifier 62 that drives output speaker 65. An alert tone at output terminal 408 is then applied through the output speaker amplifier 62 to the speaker 65 as an audible tone, alerting the craftsperson of the presence of data traffic on the line. The routine then loops to step 505.

If the answer to query step 517 is NO, the routine transitions to query step 517, which examines the TR_VOLTS signal on input terminal 401 from the DC voltage detector 70, described above with reference to FIG. 2. If the voltage level TR_VOLTS on input 401 is low (which indicates that the voltage across tip and ring is less a prescribed value sufficient for loop current generation and detection), the routine transitions to step 519, which maintains the OFFHK_EN output terminal 409 in a default logical low, high impedance state, thereby preventing the test set from asserting AC and DC termination impedances across tip and ring. The routine then loops to step 505.

However, if the voltage level TR_VOLTS on input 401 is high (which indicates that the voltage across tip and ring is at least equal to the prescribed threshold value sufficient for loop current generation and detection), the routine transitions to step 521, which changes the output at OFFHK_EN output terminal 409 from its default logical low, high impedance state, to a high logic level, thereby enabling AND gate 430. As noted above, the output of AND gate 430 effectively corresponds to the output of control gate 50 in FIG. 1 and is coupled over line 54 to the voltage controlled switch 80. Thus, if the result of query step 517 is YES, the output of AND gate 430 closes voltage controlled switch 80, and thereby allows the craftsperson to place the test set in an OFF-HOOK mode (place AC and DC termination impedances across tip and ring) by closing talk mode switch 20. The routine then loops to step 505.

From the routine of FIG. 5, it will be appreciated that it is effectively impossible for the craftsperson to place an OFF-HOOK condition on the line (bridge the tip and ring lines with DC and AC termination impedances) by closing the talk mode (OFF-HOOK) switch. The signal stimulus processing flow sequence ensures that only in response to the conditions that the monitored telephone line is carrying no data traffic and there is at least a prescribed minimum DC voltage across tip and ring, will the AND gate 430 generate an enabling signal to the normally open voltage controlled switch 80. It is not until switch 80 is closed by the output of AND gate 430, that the craftsperson is provided with the ability to place DC and AC termination impedances across the tip and ring input terminals by closing the talk mode switch.

As will be appreciated from the foregoing description, the possibility of corrupting digital data traffic being carried by a telephone line, particularly a powered data line, by the connection of equipment, such as a telephone test set, to such a line, is effectively prevented in accordance with the present invention, which augments the telephone test set equipment with a mechanism that will prevent the test set from asserting an OFF-HOOK condition on the line, unless it has been determined that each of two conditions are satisfied. These conditions are: 1- that no digital data traffic is being carried by the line; and 2- that the electrical voltage condition of the line satisfies a prescribed minimum voltage level criterion. If either of these conditions is not satisfied, a switch circuit installed in the test set's connection path to the line is maintained in a default, open condition, so that it is effectively impossible for the line to be presented with an OFF-HOOK condition through operation of the test set. This default condition remains in effect until both criterion are fulfilled. As a further safety precaution, should the line to which the test set is connected be determined to be carrying digital data traffic, the invention causes an audible alert tone to be generated as a warning signal to the craftsperson.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of preventing a telephone instrument, that is connectable to a telephone line and has the capability of coupling an electrical element in circuit with said telephone line, from coupling said electrical element in circuit with said telephone line, said electrical element, if placed in circuit with said telephone line during the transmission of digital data signals thereover, causing said digital data signals to be degraded, said method comprising the steps of:

(a) initially placing said telephone instrument in a default mode in which said electrical element is not coupled is not coupled with said telephone line;

(b) monitoring said telephone line for the presence of digital data signals and for the presence of a prescribed minimum voltage thereon; and (c) maintaining said telephone instrument in said default mode, unless step (b) detects both the absence of digital data signals and the presence of said prescribed minimum voltage on said telephone line, and thereupon enabling said telephone instrument to couple said electrical element in circuit with said telephone line.

2. A method according to claim 1, wherein said telephone instrument includes a switch circuit installed in a connection path between said telephone line and said electrical element, and wherein step (c) comprises preventing said switch circuit from being placed in a closed condition unless step (b) detects both the absence of digital data signals and the presence of said prescribed minimum voltage on said telephone line, and, in response thereto, enabling said telephone instrument to couple said electrical element in circuit with said telephone line.

3. A method according to claim 2, wherein said electrical element comprises a telephone line termination impedance that is controllably coupled in circuit with said telephone line in the course of said telephone instrument going OFF-HOOK, said switch circuit being installed in a connection path between said telephone line and said telephone line termination impedance, and wherein step (c) comprises preventing said switch circuit from being placed in a closed condition and thereby terminate said telephone line with said telephone line termination impedance unless step (b) detects both the absence of digital data signals and the presence of said prescribed minimum voltage on said telephone line.

4. A method according to claim 1, wherein step (c) further includes, in response to step (b) detecting the presence of digital data signals on said telephone line, generating a data-present alert signal.

5. A method according to claim 1, wherein step (c) further includes, in response to step (b) detecting the presence of digital data signals on said telephone line, generating an audible tone alerting a user of said telephone instrument to the presence of data signals on said telephone line.

6. A method according to claim 1, wherein said telephone instrument comprises a telephone line test set, and wherein step (c) comprises preventing said telephone line test set from coupling said electrical element in circuit with said telephone line and thereby asserting an OFF-HOOK condition on said telephone line, unless step (b) detects both the absence of digital data signals and also the presence of said prescribed minimum voltage on said telephone line.

7. A method of controllably enabling a telephone instrument that is connectable to a telephone line and has the capability of coupling an electrical element in circuit with said telephone line, to couple said electrical element in circuit with said telephone line, said method comprising the steps of:

(a) providing a default mode of operation of said telephone instrument in which said electrical element is prevented from being placed in circuit with said telephone line;

(b) monitoring said telephone line for the presence of digital data signals and for the presence of a prescribed minimum voltage thereon; and (c) only in response to step (b) detecting both the absence of digital data signals and the presence of said prescribed minimum voltage on said telephone line, transitioning from said default mode of operation of said telephone instrument by enabling said telephone instrument to couple said electrical element in circuit with said telephone line.

8. A method according to claim 7, wherein said telephone instrument includes a switch circuit installed in a connection path between said telephone line and said electrical element, and wherein step (a) comprises normally preventing said switch circuit from being placed in a closed condition, so as to disable the capability of said telephone instrument to couple said electrical element in circuit with said telephone line, and wherein step (c) comprises, in response to step (b) detecting both the absence of digital data signals and the presence of said prescribed minimum voltage on said telephone line, transitioning from said default mode of operation of said telephone instrument by placing said switch circuit in a closed condition and thereby enabling said telephone instrument to couple said electrical element in circuit with said telephone line.

9. A method according to claim 8, wherein said electrical element comprises a telephone line termination impedance that is to be controllably coupled in circuit with said telephone line in the course of said telephone instrument going OFF-HOOK, said switch circuit being installed in a connection path between said telephone line and said telephone line termination impedance, and wherein step (c) comprises placing said switch circuit in a closed condition and thereby enabling said telephone line to be coupled therethrough to said telephone line termination impedance, in response to step (b) detecting both the absence of digital data signals and the presence of said prescribed minimum voltage on said telephone line.

10. A method according to claim 7, wherein step (c) further includes, in response to step (b) detecting the presence of digital data signals on said telephone line, generating a data-present alert signal.

11. A method according to claim 7, wherein step (c) further includes, in response to step (b) detecting the presence of digital data signals on said telephone line, generating an audible tone alerting a user of said telephone instrument to the presence of data signals on said telephone line.

12. A method according to claim 7, wherein said telephone instrument comprises a telephone line test set, and wherein step (c) comprises enabling said telephone line test set to couple said electrical element in circuit with said telephone line and thereby assert an OFF-HOOK condition on said telephone line, in response to step (b) indicating both the absence of digital data signals and also the presence of said prescribed minimum voltage on said telephone line.

13. A method of controllably preventing a telephone instrument that is connectable to a telephone line and has the capability of coupling an electrical element in circuit with said telephone line, from coupling said electrical element in circuit with said telephone line, said method comprising the steps of:

(a) providing a default mode of operation of said telephone instrument in which said electrical element is normally prevented from being placed in circuit with said telephone line;

(b) monitoring said telephone line for the presence of digital data signals thereon;

(c) in response to step (b) detecting the presence of digital data signals on said telephone line, generating a data-present signal to alert a user of said telephone instrument to the presence of data signals on said telephone line, and maintaining a mode of operation of said telephone instrument in which said electrical element is prevented from being coupled in circuit with said telephone line;

(d) monitoring said telephone line for the presence of a prescribed minimum voltage thereon; and (e) in response to step (c) failing to detect the presence of digital data signals on said telephone line, and step (d) detecting the presence of said prescribed voltage on said telephone line, transitioning from said default mode of Operation of said telephone instrument by enabling said telephone instrument to couple said electrical element in circuit with said telephone line.

14. A method according to claim 13, wherein said telephone instrument includes a switch circuit installed in a connection path between said telephone line and said electrical element, and wherein step (a) comprises normally preventing said switch circuit from being placed in a closed condition, so as to disable the capability of said telephone instrument to couple said electrical element in circuit with said telephone line, and wherein step (e) comprises, in response to step (b) failing to detect the presence of digital data signals on said telephone line, and step (d) detecting the presence of said prescribed minimum voltage on said telephone line, transitioning from said default mode of operation of said telephone instrument by placing said switch circuit in a closed condition and thereby enabling said telephone instrument to couple said electrical element in circuit with said telephone line.

15. A method according to claim 14, wherein said electrical element comprises a telephone line termination impedance controllably coupled to said telephone line in the course of said telephone instrument going OFF-HOOK, said switch circuit being installed in a path between said telephone line and said telephone line termination impedance, and wherein step (e) comprises placing said switch circuit in a closed condition to enable said telephone line to be coupled therethrough to said telephone line termination impedance, in response to step (b) failing to detect the presence of digital data signals, and step (d) detecting the presence of said prescribed minimum voltage on said telephone line.

16. A method according to claim 13, wherein step (c) comprises generating an audible tone alerting a user of said telephone instrument to the presence of data signals on said telephone line.

17. A method according to claim 13, wherein said telephone instrument comprises a telephone line test set, and wherein step (e) comprises enabling said telephone line test set to couple said electrical element in circuit with said telephone line and thereby assert an OFF-HOOK condition on said telephone line, in response to step (c) failing to detecting the presence of digital data signals on said telephone line, and step (d) detecting the presence of said prescribed minimum voltage on said telephone line.

18. A circuit arrangement for preventing a telephone instrument, that is connectable to a telephone line and has the capability of coupling an electrical element in circuit with said telephone line, from coupling said electrical element in circuit with said telephone line, said electrical element, if placed in circuit with said telephone line during the transmission of digital data signals thereover, causing said digital data signals to be degraded, said circuit arrangement comprising:

a data detector which monitors said telephone line for the presence of digital data signals thereon;

a DC voltage detector which monitors said telephone line for the presence of a prescribed minimum DC voltage thereon; and a control unit, which is coupled to said data detector and said DC voltage detector, and is operative to normally disable the capability of said telephone instrument to couple said electrical element in circuit with said telephone line, but which is operative, in response to said data detector detecting the absence of digital data signals on said telephone line, and said DC voltage detector detecting the presence of said prescribed minimum DC voltage on said telephone line, to enable the capability of said telephone instrument to couple said electrical element in circuit with said telephone line.

19. A circuit arrangement according to claim 18, wherein said telephone instrument includes a switch circuit installed in a connection path between said telephone line and said electrical element, and wherein said control unit is coupled to said switch circuit and is operative to normally prevent said switch circuit from being placed in a closed condition, but, in response to both said data detector detecting the absence of digital data signals on said telephone line, and said DC voltage detector detecting the presence of said prescribed minimum DC voltage, enabling the capability of said telephone instrument to couple said electrical element in circuit with said telephone line.

20. A circuit arrangement according to claim 19, wherein said electrical element comprises a telephone line termination impedance that is controllably coupled in circuit with said telephone line in the course of said telephone instrument going OFF-HOOK, said switch circuit being installed in a connection path between said telephone line and said telephone line termination impedance, and wherein said control unit is operative to normally prevent said switch circuit from being placed in a closed condition, but is operative to terminate said telephone line with said telephone line termination impedance, in response to said data detector detecting the absence of digital data signals on said telephone line, and said DC voltage detector detecting said prescribed minimum DC voltage on said telephone line.

21. A circuit arrangement according to claim 18, further including a data-present alert signal generator which generates a data-present alert signal in response to said data detector detecting the presence of digital data signals on said telephone line.

22. A circuit arrangement according to claim 21, wherein said data-present alert signal generator generates an audible data-present alert signal.

23. A circuit arrangement according to claim 18, wherein said telephone instrument comprises a telephone line test set, and wherein said control unit is operative to prevent said telephone line test set from coupling said electrical element in circuit with said telephone line and thereby asserting an OFF-HOOK condition on said telephone line, unless said data detector detects the absence of digital data signals on said telephone line, and said DC voltage detector detects the presence of said prescribed minimum DC voltage on said telephone line.

24. A circuit arrangement for controllably enabling a telephone instrument that is connectable to a telephone line and has the capability of coupling an electrical element in circuit with said telephone line, to couple said electrical element in circuit with said telephone line, comprising:

a controlled switch circuit installed in a connection path between said telephone line and said electrical element;

a control unit which is operative to normally prevent said controlled switch circuit from being placed in a closed condition, so as to disable the capability of said telephone instrument to couple said electrical element in circuit with said telephone line;

a data detector which monitors said telephone line for the presence of digital data signals thereon; and a DC voltage detector which monitors said telephone line for the presence of a prescribed minimum DC voltage thereon; and wherein said control unit, in response to said data detector failing to detect digital data signals on said telephone line, and in response to said DC voltage detector detecting the presence of said prescribed minimum DC voltage on said telephone line, being operative to place said controlled switch circuit in a closed condition and thereby enable said telephone instrument to couple said electrical element in circuit with said telephone line.

25. A circuit arrangement according to claim 24, wherein said electrical element comprises a telephone line termination impedance that is to be controllably coupled in circuit with said telephone line in the course of said telephone instrument going OFF-HOOK, said controlled switch circuit being installed in a connection path between said telephone line and said telephone line termination impedance, and wherein said control unit is operative to normally place said controlled switch circuit in an open condition, but is operative to place said controlled switch circuit in a closed condition and thereby enable said telephone line to be coupled therethrough to said telephone line termination impedance, in response to said data detector failing to detect the presence of digital data signals on said telephone line, and in response to said DC voltage detector detecting the presence of said prescribed minimum DC voltage on said telephone line.

26. A circuit arrangement according to claim 24, further including a data-present alert signal generator which is generates a data-present alert signal in response to said data detector detecting the presence of digital data signals on said telephone line.

27. A circuit arrangement according to claim 26, wherein said data-present alert signal generator generates an audible data-present alert signal.

28. A circuit arrangement according to claim 24, wherein said telephone instrument comprises a telephone line test set, and wherein said control unit is operative to enable said telephone line test set to couple said electrical element in circuit with said telephone line and thereby assert an OFF-HOOK condition on said telephone line, in response to said data detector failing to detect digital data signals on said telephone line, and in response to said DC voltage detector detecting the presence of said prescribed minimum DC voltage on said telephone line.

29. A circuit arrangement according to claim 24, further including first and second terminals, connectable to tip/ring and ring/tip leads of said telephone line, said first terminal being coupled to a normally open talk mode switch, which is closable by a user of said telephone instrument to place said telephone instrument in an OFF-HOOK talk mode, said talk mode switch being coupled to a first input of a full wave rectifier circuit, a second input of which is coupled to said second terminal, said first and second terminals being coupled to said data detector, and wherein said DC voltage level detector is coupled to said full wave rectifier circuit, and is operative to compare the rectified voltage output of said full wave rectifier circuit with said prescribed minimum DC voltage.

30. A circuit arrangement for controllably preventing a telephone instrument that is connectable to a telephone line and has the capability of coupling an electrical element in circuit with said telephone line, from coupling said electrical element in circuit with said telephone line, comprising:

a controlled switch circuit installed in a connection path between said telephone line and said electrical element;

a control unit which is operative to normally prevent said controlled switch circuit from being placed in a closed condition, so as to disable the capability of said telephone instrument to couple said electrical element in circuit with said telephone line;

a data detector which monitors said telephone line for the presence of digital data signals thereon;

a data-present alert signal generator; and wherein said control unit, in response to said data detector detecting the presence of digital data signals on said telephone line, is operative to cause said data-present alert signal generator to generate a data-present alert signal, and to maintaining said controlled switch circuit in an open condition, so as to prevent said electrical element from being coupled in circuit with said telephone line; and a DC voltage detector which monitors said telephone line for the presence of a prescribed minimum DC voltage on said telephone line, and wherein said control unit, in response said data detector failing to detect the presence of digital data signals on said telephone line, and said DC voltage detector detecting the presence of said prescribed minimum DC voltage on said telephone line, being operative to close said controlled switch circuit and thereby enable said telephone instrument to couple said electrical element in circuit with said telephone line.

31. A circuit arrangement according to claim 30, wherein said data-present alert signal generator generates an audible data-present alert signal.

32. A circuit arrangement according to claim 30, wherein said electrical element comprises a telephone line termination impedance that is to be controllably coupled in circuit with said telephone line in the course of said telephone instrument going OFF-HOOK, said controlled switch circuit being installed in a connection path between said telephone line and said telephone line termination impedance, and wherein said control unit is operative to place said controlled switch circuit in a closed condition and thereby enable said telephone line to be coupled therethrough to said telephone line termination impedance, in response to said data detector failing to detect the presence of digital data signals on said telephone line, and in response to said DC voltage detector detecting the presence of said prescribed minimum DC voltage on said telephone line.

33. A circuit arrangement according to claim 30, wherein said telephone instrument comprises a telephone line test set, and wherein said control unit is operative to close said controlled switch circuit and thereby enable said telephone line test set to couple said electrical element in circuit with said telephone line and assert an OFF-HOOK condition on said telephone line, in response said data detector failing to detect the presence of digital data signals on said telephone line, and said DC voltage detector detecting the presence of said prescribed minimum DC voltage on said telephone line.

* * * * *